US008727748B2

(12) United States Patent
Groeger et al.

(10) Patent No.: US 8,727,748 B2

(45) Date of Patent: May 20, 2014

(54) HIGH-PRESSURE CLEANING DEVICE

(75) Inventors: Bertram Groeger, Korb (DE); Walter Schiffhauer, Lautenbach (DE); Lanfranco Pol, Quistello Mn (IT)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 182 days.

(21) Appl. No.: 13/103,169

(22) Filed: May 9, 2011

(65) Prior Publication Data

US 2011/0274570 A1 Nov. 10, 2011

Related U.S. Application Data

(63) Continuation of application No. PCT/EP2009/001443, filed on Feb. 28, 2009.

(30) Foreign Application Priority Data

Nov. 14, 2008 (DE) ........................ 10 2008 058 724

(51) Int. Cl.

| | |
|---|---|
| ***F04D 29/58*** | (2006.01) |
| ***F04D 13/06*** | (2006.01) |
| ***H02K 5/24*** | (2006.01) |
| ***H02K 9/193*** | (2006.01) |

(52) U.S. Cl.

USPC .............. 417/371; 417/372; 417/363; 310/63

(58) Field of Classification Search

USPC ............ 310/54, 52, 89, 62, 63; 417/352, 372, 417/423.1, 423.14, 410.3, 423.7, 366, 371, 417/33, 363; 15/49.1, 50.1, 98

See application file for complete search history.

(56) References Cited

U.S. PATENT DOCUMENTS

| | | | | |
|---|---|---|---|---|
| 1,431,907 A | | 10/1922 | Cramer | |
| 1,614,091 A | | 1/1927 | Van Toff | |
| 2,037,245 A | | 4/1936 | Leifheit et al. | |
| 2,301,063 A | | 11/1942 | McConaghy | |
| 2,734,459 A | | 2/1956 | Zimsky | |
| 2,763,214 A | | 9/1956 | White | |
| 2,782,720 A | * | 2/1957 | Dochterman | 417/357 |
| 2,913,988 A | | 11/1959 | White | |

(Continued)

FOREIGN PATENT DOCUMENTS

| | | |
|---|---|---|
| DE | 926 676 | 4/1955 |
| DE | 27 16 184 | 10/1977 |

(Continued)

OTHER PUBLICATIONS

Patent Abstracts of Japan, Abstract of Japanese Patent "Scroll-Type Fluid Machine", Publication No. 61250393, Nov. 7, 1986, Japanese Application No. 60091533, Filed Apr. 26, 1985.

(Continued)

*Primary Examiner* — Bryan Lettman

(74) *Attorney, Agent, or Firm* — Lipsitz & McAllister, LLC

(57) ABSTRACT

A high-pressure cleaning device has a housing which surrounds a motor pump unit which comprises a liquid-cooled electric motor and a pump. The pump has a suction inlet and a pressure outlet. Liquid, which is subsequently subjected to pressure by the pump, can be supplied to the electric motor for the purpose of cooling it. The electric motor is configured as a fan-less asynchronous motor and the motor pump unit is mounted via vibration-damping buffer elements.

23 Claims, 2 Drawing Sheets

(56) References Cited

U.S. PATENT DOCUMENTS

| | | | | |
|---|---|---|---|---|
| 2,914,253 | A | 11/1959 | Jobus et al. | |
| 2,993,449 | A | 7/1961 | Harland | |
| 3,135,213 | A | 6/1964 | Smith et al. | |
| 3,371,613 | A | 3/1968 | Dahlgren et al. | |
| 3,426,691 | A | 2/1969 | Anderson | |
| 3,525,001 | A | 8/1970 | Erickson | |
| 3,667,870 | A | 6/1972 | Yoshida et al. | |
| 3,738,781 | A | 6/1973 | Hagemann et al. | |
| 3,744,935 | A | 7/1973 | Magni | |
| 3,992,133 | A | 11/1976 | Brunner | |
| 4,480,967 | A | 11/1984 | Schulze | |
| 4,516,044 | A | 5/1985 | Bone | |
| 4,808,087 | A | 2/1989 | Tsutsui et al. | |
| 4,844,701 | A | 7/1989 | Wolford et al. | |
| 4,878,804 | A | 11/1989 | Akerman et al. | |
| 4,922,148 | A | 5/1990 | Kitamura | |
| 4,934,914 | A | 6/1990 | Kobayashi et al. | |
| 5,113,103 | A | 5/1992 | Blum et al. | |
| 5,145,335 | A * | 9/1992 | Abelen et al. | 417/410.3 |
| 5,174,730 | A | 12/1992 | Nieuwkamp et al. | |
| 5,240,391 | A | 8/1993 | Ramshankar et al. | |
| 5,283,915 | A * | 2/1994 | Idland et al. | 4/541.1 |
| 5,326,235 | A | 7/1994 | Bruhn | |
| 5,349,147 | A * | 9/1994 | Gallone | 200/552 |
| 5,350,281 | A | 9/1994 | Hagshenas | |
| 5,354,182 | A | 10/1994 | Niemiec et al. | |
| 5,363,674 | A | 11/1994 | Powell | |
| 5,388,970 | A | 2/1995 | Muckelmann et al. | |
| 5,395,214 | A | 3/1995 | Kawahara et al. | |
| 5,533,875 | A | 7/1996 | Crum et al. | |
| 5,616,973 | A | 4/1997 | Khazanov et al. | |
| 5,772,411 | A | 6/1998 | Crum et al. | |
| 5,938,389 | A | 8/1999 | Shore et al. | |
| 6,000,917 | A | 12/1999 | Smerud et al. | |
| 6,017,204 | A | 1/2000 | Holzapfel et al. | |
| 6,068,459 | A | 5/2000 | Clarke et al. | |
| 6,074,141 | A | 6/2000 | Ishikawa et al. | |
| 6,074,185 | A | 6/2000 | Protos | |
| 6,132,183 | A * | 10/2000 | Li et al. | 417/363 |
| 6,146,113 | A | 11/2000 | Fassnacht et al. | |
| 6,398,530 | B1 | 6/2002 | Hasemann | |
| 6,814,551 | B2 | 11/2004 | Kammhoff et al. | |
| 6,871,512 | B2 | 3/2005 | Tsunoda | |
| 7,005,765 | B1 | 2/2006 | Schulz et al. | |
| 7,063,519 | B2 | 6/2006 | Agrawal et al. | |
| 7,182,583 | B2 | 2/2007 | Gandrud et al. | |
| 7,591,147 | B2 | 9/2009 | Masoudipour et al. | |
| 8,147,216 | B2 * | 4/2012 | Schiffhauer et al. | 417/371 |
| 2003/0031570 | A1 | 2/2003 | Kammhoff et al. | |
| 2005/0175479 | A1 | 8/2005 | Gandrud et al. | |
| 2010/0047091 | A1 | 2/2010 | Schiffhauer et al. | |

FOREIGN PATENT DOCUMENTS

| | | | | |
|---|---|---|---|---|
| DE | 29 20 883 | | 12/1980 | |
| DE | 81 11 792 | | 8/1981 | |
| DE | 30 17 117 | | 11/1981 | |
| DE | 35 45 665 | | 7/1987 | |
| DE | 85 36 175 | | 7/1987 | |
| DE | 36 03 423 | | 8/1987 | |
| DE | 37 38 592 | | 5/1989 | |
| DE | 38 17 641 | | 11/1989 | |
| DE | 41 05 349 | | 8/1992 | |
| DE | 94 17 662 | | 2/1995 | |
| DE | 196 04 447 | | 2/1997 | |
| DE | 196 52 706 | | 6/1997 | |
| DE | 197 16 758 | | 10/1998 | |
| DE | 199 10 460 | | 9/2000 | |
| DE | 102 47 310 | | 4/2004 | |
| DE | 103 05 812 | | 9/2004 | |
| DE | 103 07 813 | | 9/2004 | |
| DE | 10 2005 046 120 | | 3/2007 | |
| DE | 10 2007 009 394 | | 8/2008 | |
| DE | 102007009394 | * | 8/2008 | F04B 39/06 |
| EP | 0 177 925 | | 4/1986 | |
| EP | 0 314 607 | | 5/1989 | |
| EP | 0 627 558 | | 12/1994 | |
| EP | 0 735 270 | | 10/1996 | |
| EP | 0 819 852 | | 1/1998 | |
| EP | 0718957 | | 2/1998 | |
| FR | 2 473 912 | | 7/1981 | |
| FR | 2 504 206 | | 10/1982 | |
| JP | 51-31103 | | 8/1949 | |
| JP | 61-9566 | | 1/1986 | |
| JP | 61-110877 | | 7/1986 | |
| JP | 63257434 | | 10/1988 | |
| JP | 213135 | | 1/1990 | |
| JP | 387836 | | 9/1991 | |
| JP | 06016186 | | 1/1994 | |
| JP | 09-014199 | | 1/1997 | |
| JP | 10-009135 | | 1/1998 | |
| JP | 10317964 | | 12/1998 | |
| JP | 11022482 | | 1/1999 | |
| JP | 11062607 | | 3/1999 | |
| JP | 11270885 | | 10/1999 | |
| JP | 2000130800 | | 5/2000 | |
| JP | 2003193837 | | 7/2003 | |
| JP | 2003-232280 | | 8/2003 | |
| JP | 2005306153 | | 11/2005 | |
| JP | 2006291744 | | 10/2006 | |
| JP | 2007-002713 | | 1/2007 | |
| JP | 2008039251 | | 2/2008 | |
| WO | 0223699 | | 3/2002 | |

OTHER PUBLICATIONS

Patent Abstracts of Japan, Abstract of Japan Patent "Scroll Type Hydraulic Unit", Publication No. 02196182, Aug. 2, 1990, Japanese Application No. 01015979, Filed Jan. 24, 1989.

Patent Abstracts of Japan, Abstract of Japanese Patent "Scroll Compressor", Publication No. 10220382, Aug. 18, 1998, Japanese Application No. 09022829, Filed Feb. 5, 1997.

* cited by examiner

HIGH-PRESSURE CLEANING DEVICE

This application is a continuation of international application number PCT/EP2009/001443 filed on Feb. 28, 2009 and claims the benefit of German application number 10 2008 058 724.9 filed on Nov. 14, 2008.

The present disclosure relates to the subject matter disclosed in international application number PCT/EP2009/001443 of Feb. 28, 2009 and German application number 10 2008 058 724.9 of Nov. 14, 2008, which are incorporated herein by reference in their entirety and for all purposes.

BACKGROUND OF THE INVENTION

The invention relates to a high-pressure cleaning device with a housing which surrounds a motor pump unit which comprises a liquid-cooled electric motor and a pump driven by it, wherein the pump has a suction inlet for the supply of liquid to be subjected to pressure and a pressure outlet for discharging liquid subjected to pressure and wherein liquid can be supplied to the electric motor for the purpose of cooling it and subsequently subjected to pressure by the pump.

High-pressure cleaning devices of this type are known, for example, from DE 9417662 U1. Surfaces can be cleaned with their aid in that a stream of liquid subjected to pressure, for example a jet of water, can be directed onto the surface. The liquid to be subjected to pressure is supplied to the pump via a suction inlet. It will subsequently be subjected to pressure by the pump and discharged via the pressure outlet. A high-pressure hose can be connected, for example, to the pressure outlet and a spray lance arranged, for example, at its free end.

The electric motor forms a constructional unit in combination with the pump and, in many cases, in combination with gearing arranged between the pump and the electric motor. This will be designated in the following as motor pump unit. It is pre-assembled during the production of the high-pressure cleaning device and subsequently inserted into a housing which surrounds the motor pump unit.

The electric motor of such high-pressure cleaning devices is often cooled in that a stream of air is generated by means of a fan driven by the electric motor and guided along the electric motor. For this purpose, the housing has ventilation openings so that cooling air can enter the housing and can be guided out of the housing once the electric motor has been cooled.

DE 9417662 U1 describes a high-pressure cleaning device, with which the electric motor can be cooled not only by cooling air but, in addition, also by liquid which is subsequently subjected to pressure by the pump. First of all, the liquid is guided for this purpose around the electric motor and afterwards it passes to the suction inlet of the pump and can be subjected to pressure by it.

The operation of such high-pressure cleaning devices is normally associated with the generation of a considerable amount of noise. The object of the invention is to further develop a high-pressure cleaning device of the type specified at the outset in such a manner that it generates less noise.

SUMMARY OF THE INVENTION

This object is accomplished in accordance with the invention, in a high-pressure cleaning device of the generic type, in that the electric motor is configured as a fan-less asynchronous motor and the motor pump unit is mounted via vibration-damping buffer elements.

A fan-less electric motor is used in the case of the high-pressure cleaning device according to the invention. The electric motor is not, therefore, cooled by a stream of cooling air generated by a fan but rather by liquid to be conveyed by the pump. This has the advantage that ventilation openings in the housing can be dispensed with. As a result, the noise emission of the high-pressure cleaning device is considerably reduced. The electric motor of the high-pressure cleaning device is designed as an asynchronous motor. This has the advantage that commutator and brushes can be omitted in the case of the electric motor. As a result, the generation of heat in the electric motor is diminished considerably. This makes the cooling of the electric motor with liquid easier without any stream of cooling air needing to be generated. A further reduction in the noise emission is achieved by the motor pump unit being mounted via vibration-damping buffer elements. A rigid contact of the motor pump unit to the housing can thus be dispensed with. As a result, the transfer of noise from the motor pump unit to the housing via rigid mechanical components is prevented.

In the case of the high-pressure cleaning device according to the invention, the motor pump unit is mounted via vibration-damping buffer elements. The mounting can, in this case, be directly on the housing via the buffer elements.

Alternatively or in addition, it may be provided for the high-pressure cleaning device to have a separate support structure, for example a casing or a frame which mounts the motor pump unit via the vibration-damping buffer elements.

An additional reduction in the generation of noise is achieved in a preferred development of the invention in that the motor pump unit is surrounded by at least one sound absorbing element over at least part of its outer circumference. For example, it may be provided for a sound absorbing element to be arranged in the area of a rear section and/or in the area of a front section of the housing. The sound absorbing elements preferably accommodate the motor pump unit between them. It may also be provided for the housing to have a base and a top, wherein a sound absorbing element can also be arranged in the area of the base and/or of the top.

It may be provided for at least one sound absorbing element to be configured as an insulation mat. This can be produced, for example, from a plastic material and have, in particular, a foam-like structure.

In order to make the connection of a high-pressure hose to the pressure outlet possible and also to make the connection of a supply hose to the suction inlet possible, a suction connection piece can be connected to the suction inlet and/or a pressure connection piece can be connected to the pressure outlet.

The free ends of the suction connection piece and the pressure connection piece can project out of the housing. Suction connection piece and pressure connection piece pass, for this purpose, through openings arranged in the housing. In order to avoid noise being able to exit from the housing through the openings, it is provided in one advantageous embodiment for the suction connection piece and/or the pressure connection piece to pass through an insulation mat. The suction connection piece and/or the pressure connection piece is thus surrounded by the insulation mat in the area of the opening in the housing. This ensures that practically no noise can exit from the housing via the opening of the respective connection pieces.

It is of particular advantage when the suction connection piece and/or the pressure connection piece is decoupled mechanically from the edge area of the respective opening in the housing since, as a result, no noise can be transferred directly to the housing from the suction connection piece and from the pressure connection piece, respectively.

The use of a fan-less asynchronous motor in combination with the mounting of the motor pump unit via vibration-damping buffer elements makes it possible to reduce the noise generated by the high-pressure cleaning device considerably. With a view to as low a noise emission as possible it would be of advantage if the housing were to have no openings whatsoever. This would, however, entail the risk, in the case of a malfunctioning of the high-pressure cleaning device, of liquid introduced into the interior of the housing possibly coming into contact with current-carrying parts of the high-pressure cleaning device. This could be the case when liquid can escape from a line section within the housing. In order to minimize this risk and, at the same time, ensure that the high-pressure cleaning device generates only a small amount of noise, it is of advantage when the housing has outflow openings, the overall opening surface area of which does not exceed 3000 $mm^2$ at a sound power level of the high-pressure cleaning device during high-pressure operation of at the most 78 dB(A). It has been shown that outflow openings of this type do not substantially affect the generation of noise by the high-pressure cleaning device but that, in the case of any malfunctioning of the high-pressure cleaning device, they reliably prevent liquid from coming into contact with current-carrying components of the high-pressure cleaning device. In the case of any malfunction, the liquid can, on the contrary, flow out of the housing via the outflow opening before it comes into contact with current-carrying parts.

Ventilation openings can therefore be omitted in the housing of the high-pressure cleaning device but the high-pressure cleaning device can have outflow openings which do not, however, exceed an overall opening surface area of 3000 $mm^2$. A high-pressure cleaning device can, therefore, be provided which fulfills all safety requirements in a constructionally simple manner and generates considerably less noise. The maximum opening surface area of 3000 $mm^2$ is present when the high-pressure cleaning device has a sound power level during high-pressure operation of at the most 78 dB(A), measured in accordance with European standard EN 60704. The sound power level, i.e. the generation of noise, could be increased by increasing the opening surface area.

In one particularly preferred development of the invention, the entire opening surface area of the outflow openings is at the most 1500 $mm^2$. As a result, the generation of noise in the high-pressure cleaning device can be reduced as well without the technical requirements placed on the high-pressure cleaning device with respect to safety being impaired.

It is of particular advantage when the outflow openings are arranged in an area of the housing adjacent to the pump. The pump is preferably aligned so as to be flush with the motor shaft of the electric motor, in particular it may be provided for the electric motor, gearing adjacent to it and the pump to be arranged one behind the other in the direction of the motor shaft. The outflow openings are preferably arranged only in the area of the housing which surrounds the pump but not in the area which surrounds the electric motor. It has been shown that this makes an additional reduction in the generation of noise by the high-pressure cleaning device possible.

It is of particular advantage when the housing has a front section and a rear section which accommodate the motor pump unit between them and when the outflow openings are arranged in the rear section next to the pump. The front section does not, therefore, have either ventilation openings or outflow openings. As a result, the generation of noise can be minimized as well.

At least one outflow opening is favorably covered by a sound absorbing element. It may be provided, in particular, for the housing to have several outflow openings which are covered by a sound absorbing element. For example, the outflow openings can be covered by an insulation mat. In the case of any malfunctioning of the high-pressure cleaning device liquid can, therefore, flow out of the housing but the emission of noise via the outflow openings is restricted at least to a considerable extent.

As already explained, the motor pump unit is mounted via vibration-damping buffer elements. In this respect, it is favorable when at least two vibration-damping buffer elements are arranged at the outer circumference of the motor pump unit, accommodate the motor pump unit between them and are held on a support structure of the high-pressure cleaning device. The support structure can, in this case, be formed by the housing itself, at least in part, but is may also be provided for a frame or a casing to be used as support structure. It has surprisingly been shown that in the case of a mounting of the motor pump unit in such a manner that at least two vibration-damping buffer elements are arranged at the outer circumference, the transfer of noise from the motor pump unit to the support structure can be reduced very considerably.

It is of particular advantage when two vibration-damping buffer elements are located diametrically opposite one another.

It may be provided, in particular, for only two vibration-damping buffer elements, which accommodate the motor pump unit between them and therefore form an abutment, in particular for forces directed at right angles to the motor shaft, to be arranged at the outer circumference of the motor pump unit.

The support structure of the high-pressure cleaning device can comprise, for example, a rear section of the housing as well as a support bracket which can be secured to the rear section and engages around the motor pump unit, wherein at least one vibration-damping buffer element is arranged each time between the rear section and the motor pump unit and between the support bracket and the motor pump unit. Only a single vibration-damping buffer element is preferably arranged between the rear section and the motor pump unit. It is particularly advantageous when only a single buffer element is arranged between the support bracket and the motor pump unit. The support bracket can be releasably connected to the rear section, in particular a screw connection between the support bracket and the rear section can be used.

In order to be able to absorb bearing forces which are directed parallel to the motor shaft, it is provided in one advantageous embodiment of the invention for the motor pump unit to be held at its end on a support structure of the high-pressure cleaning device via at least one vibration-damping buffer element.

It may be provided, for example, for the motor pump unit to be connected at its end to a supporting device which is held on the support structure via at least one vibration-damping buffer element. It has surprisingly been shown that a particularly great reduction in the generation of noise by the high-pressure cleaning device can be achieved as a result of an arrangement of the vibration-damping buffer elements between the supporting device and the support structure. In contrast thereto, the connection between the motor pump unit and the supporting device can be brought about via rigid, mechanical components. However, it may also be provided for vibration-damping buffer elements to be arranged not only between the motor pump unit and the supporting device but also between the supporting device and the support structure.

The supporting device has, in one preferred embodiment, a bridge section which is fixed in place, on the one hand, on the pressure outlet and/or on the pressure connection piece and, on the other hand, on the support structure with at least one vibration-damping buffer element inserted in between the bridge section and the support structure. Bearing forces which act parallel to the longitudinal axis of the motor pump unit can be transferred to the support structure via the bridge section, wherein the transfer of noise from the motor pump unit to the support structure is reduced at least to a considerable extent by the insertion of at least one vibration-damping buffer element in between.

A particularly compact development of the high-pressure cleaning device according to the invention is characterized by the fact that the suction connection piece is arranged next to the pressure connection piece. This makes the handling of the high-pressure cleaning device easier when connecting a supply hose and a pressure hose.

It is favorable when the bridge section is fixed in place, on the one hand, on the suction connection piece and on the pressure connection piece and, on the other hand, on the support structure with at least one vibration-damping buffer element inserted in between the bridge section and the support structure. The bridge section is, therefore, secured not only to the pressure connection piece but also to the suction connection piece. This makes a particularly stress-resistant mounting of the motor pump unit possible.

The bridge section is preferably produced from a plastic material; it can be configured, in particular, as an injection molded part.

For the purpose of switching the electric motor on and off, the motor pump unit normally has a switch device with an actuating element which passes through an actuating opening in the housing. Actuating elements of this type are known to the person skilled in the art in the form of control buttons of rotary switches and toggle switches in manifold embodiments. In one preferred embodiment of the high-pressure cleaning device according to the invention, the actuating opening is defined by an edge of the opening in the housing which forms a labyrinth in combination with the actuating element. It is ensured as a result of the labyrinth being present that practically no noise can exit from the housing via the actuating opening. The labyrinth forms a meandering flow path for the air between the interior space of the housing and its exterior space. The labyrinth therefore represents an insulating element, with the aid of which the noise emission can be minimized.

It may be provided, for example, for the actuating element to comprise an annular wall which covers the actuating opening on its inner side and/or its outer side.

The annular wall is favorably surrounded by a circumferential collar, into which the edge of the opening in the housing dips.

The edge of the opening in the housing is preferably designed in a funnel shape.

It is of particular advantage when, irrespective of the operating state of the high-pressure cleaning device, the rotational speed of the electric motor is less than 3600 revolutions per minute if the electric motor is configured as an asynchronous motor with a mains frequency of 60 Hz and less than 3000 revolutions per minute if the electric motor is configured as an asynchronous motor with a mains frequency of 50 Hz. As a result, the generation of noise can be minimized particularly well.

It may be provided, for example, for the electric motor to be configured as an asynchronous motor with a mains frequency of 60 Hz and, irrespective of the operating state of the high-pressure cleaning device, have a rotational speed of between 3100 and 3600 revolutions per minute, in particular a rotational speed of between 3100 and 3580 revolutions per minute. If the electric motor is configured as an asynchronous motor with a mains frequency of 50 Hz, it preferably has, irrespective of the operating state of the high-pressure cleaning device, a rotational speed of between 2600 revolutions per minute and 3000 revolutions per minute, in particular a rotational speed in the range of 2700 revolutions per minute to 2950 revolutions per minute.

The electric motor is preferably configured as a two-pole asynchronous motor.

The electric power of the electric motor is preferably at the most 3500 W. It may be provided, for example, for the maximum power of the electric motor to be around 3400 W.

The overall generation of noise by the high-pressure cleaning device, i.e. its sound power level, is preferably, during high-pressure operation, at the most 78 dB(A), measured in accordance with the European standard EN 60704. It is particularly favorable when the sound power level of the high-pressure cleaning device during high-pressure operation is less than 77 dB(A), for example 76 dB(A). During low-pressure operation, the sound power level is generally even less.

The following description of one preferred embodiment of the invention serves to explain the invention in greater detail in conjunction with the drawings.

DETAILED DESCRIPTION OF THE INVENTION

Figure 1:
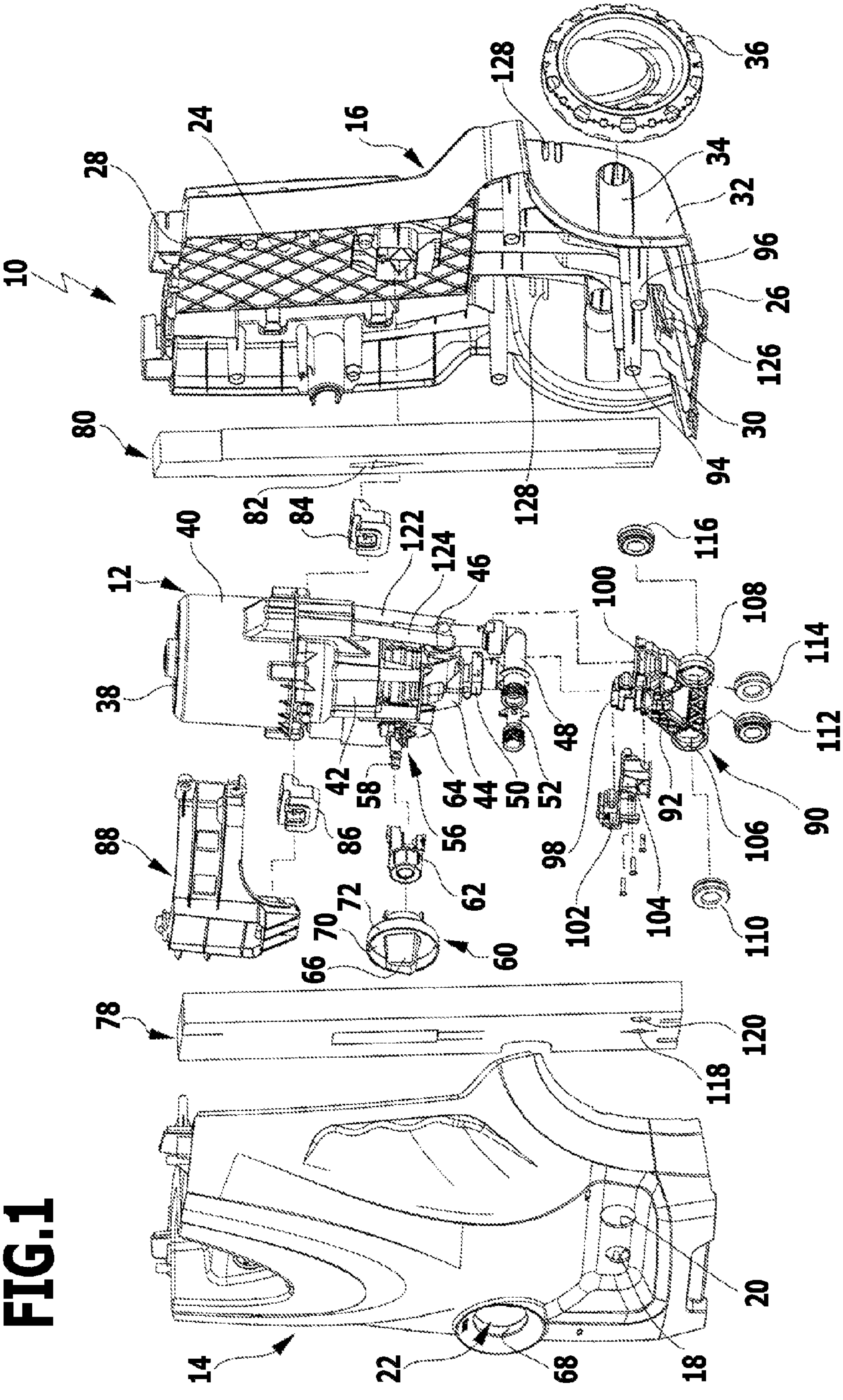
FIG. 1: an exploded illustration of a high-pressure cleaning device.
Figure 2:
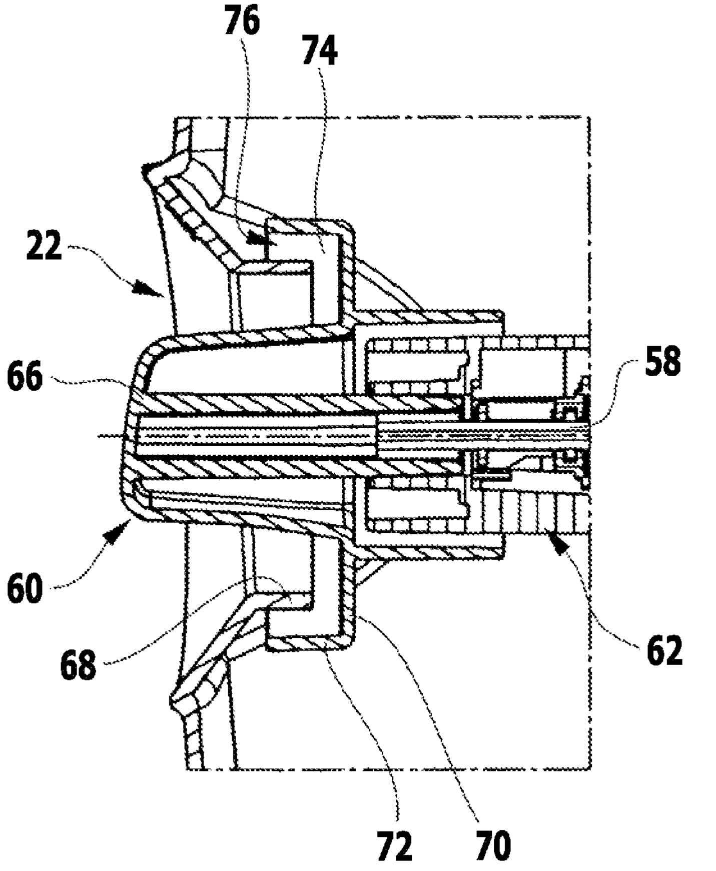
FIG. 2: a sectional view of an actuating opening of the high-pressure cleaning device from FIG. 1.

A high-pressure cleaning device according to the invention, which is designated altogether with the reference numeral 10, is illustrated in the drawings. It comprises a motor pump unit 12 which is surrounded by a housing which has a front section 14 and a rear section 16. The front section 14 is designed in the shape of a hood which can be placed on the rear section 16 and has a first opening 18 and a second opening 20 placed laterally next to one another in a lower area. An actuating opening 22 is arranged above the two openings 18, 20 and is illustrated in FIG. 2 in a sectional representation.

The rear section 16 is of a tub-like design and comprises a rear wall 24 which is adjoined in a lower area in one piece by a bottom wall 26. A top wall 28 adjoins the rear wall 24 on the side facing away from the bottom wall 26. A first side wall 30 and a second side wall 32 are integrally formed on the rear wall 24 at the side in the area between the bottom wall 26 and the top wall 28. On the upper side, a preferably U-shaped handle element, which is known per se and not, therefore, illustrated in the drawings in order to achieve a better overview, can be mounted on the top wall 28.

The two side walls 30 and 32 each have an axle stub 34 on their outer sides, on which a running wheel 36 is rotatably held. The high-pressure cleaning device 10 is, therefore, designed to be movable.

The motor pump unit 12 surrounded by the front section 14 and the rear section 16 comprises an electric motor 38 which is configured as a fan-less asynchronous motor with a mains frequency of 50 Hz or 60 Hz and has a cooling jacket 40, through which liquid can be conveyed for the purpose of cooling the electric motor 38. At its end, the electric motor 38 is adjoined by a swash plate gearing mechanism 42, via which the electric motor 38 is connected to a pump 44 of the motor pump unit 12. The pump 44 has a suction inlet 46, to which a suction connection piece 48 is connected. In addition, the pump 44 comprises a pressure outlet 50, to which a pressure connection piece 52 is connected which is arranged to the side next to the suction connection piece 48. In the assembled state of the high-pressure cleaning device 10, the pressure connection piece 52 passes through the first opening 18 and the suction connection piece 48 passes through the second opening 20.

The motor pump unit 12 has, in addition, a switch device 56, with the aid of which the electric motor 38 can be switched on and off. The switch device is designed as a rotary switch in the embodiment illustrated. It has a switch pin 58 which can be turned about its longitudinal axis in the embodiment illustrated. An actuating element of the switch device 56 is held at the free end of the switch pin 58. The actuating element is designed in the form of a turning knob 60 which is supported on a turning knob holder 62 which is seated on a switch housing 64 of the switch device 56.

As is clear, in particular, from FIG. 2, the turning knob 60 passes through the actuating opening 22 of the front section 14, the opening edge 68 of which is of a funnel-like design, with a central holding area 66 which can be gripped by the user. On the inner side, the actuating opening 22 is covered by an annular wall 70 which is integrally formed in one piece on the holding area 66 and surrounded by a circumferential collar 72. The funnel-shaped edge 68 of the actuating opening 22 dips with its free end into the annular space 74 between the circumferential collar 72 and the holding area 66 of the turning knob. As a result, a labyrinth 76 is formed between the turning knob 60 and the actuating opening 22. As will be explained in greater detail in the following, the labyrinth 76 reduces the emission of noise from the motor pump unit 12 through the actuating opening 22 into the area outside the high-pressure cleaning device 10.

The motor pump unit 12 is arranged between a first sound absorbing element in the form of a first insulation mat 78 and a second sound absorbing element in the form of a second insulation mat 80. The first insulation mat 78 is positioned on the front section 14 on its inner side and the second insulation mat 80 is arranged on the rear wall 24 of the rear section 16 on its inner side. The second insulation mat 80 has an opening 82 approximately in the center which surrounds a first vibration-damping buffer element 84 which is held on the rear wall 24. The first buffer element 84 is produced from an elastomeric material and abuts on the outer circumference of the motor pump unit 12 in the area of transition between the cooling jacket 40 and the gearing mechanism 42.

A second vibration-damping buffer element 86 abuts on the outer circumference of the motor pump unit 12 diametrically opposite the first buffer element 84 in the area of transition between the cooling jacket 40 and the gearing mechanism 42 and is likewise produced from an elastomeric material. The second buffer element 86 is held on a support bracket 88 which is essentially of a C-shaped design and surrounds the motor pump unit 12 at the height of the cooling jacket 40. The support bracket 88 is held on the rear wall 24. The two buffer elements 84 and 86 therefore accommodate the motor pump unit 12 between them and form a mounting for the motor pump unit 12. Forces acting at right angles to the longitudinal axis of the motor pump unit 12 are absorbed by the two buffer elements 84 and 86.

A supporting device 90 is arranged between the front section 14 and the rear section 16 at the end of the motor pump unit 12 facing the bottom wall 26 and forces acting parallel to the longitudinal axis of the motor pump unit 12 can be transferred via the supporting device from the motor pump unit 12 to the rear section 16, with additional vibration-damping buffer elements being inserted there between. This will be explained in greater detail in the following. The supporting device 90 comprises a bridge section 92 which abuts, on the one hand, on the suction connection piece 48 and on the pressure connection piece 52 and, on the other hand, on screw domes 94 and 96 of the rear section 16. The bridge section 92 has, for this purpose, a first U-shaped bearing section 98 and a second U-shaped bearing section 100 which abut on the pressure connection piece 52 and on the suction connection piece 48, respectively, and which each interact with a clip part 102 and 104, respectively, which surrounds the pressure connection piece 52 and the suction connection piece 58, respectively, and is screwed to the respective bearing section 98 and 100. In addition, the bridge section 92 has a first bearing ring 106 and a second bearing ring 108 which can be placed on the first screw dome 94 and the second screw dome 96, respectively. Third and fourth vibration-damping buffer elements 110, 112, which engage in one another, are arranged between the first bearing ring 106 and the first screw dome 94 and fifth and sixth vibration-damping buffer elements 114, 116, which engage in one another, are positioned between the second bearing ring 108 and the second screw dome 96. All the buffer elements 110, 112, 114 and 116 are produced from an elastomeric material. The screw domes 94 and 96, in combination with additional screw domes which are integrally formed on the rear wall 24, serve to provide a screw connection between the front section 14 and the rear section 16, in which connecting screws, which pass through the front section 14, can be screwed into the screw domes on the front side. Screw connections of this type are known per se to the person skilled in the art. In the present case, the screw domes 94 and 96 do, however, serve not only to provide a screw connection between the front section 14 and the rear section 16 but they also form a mounting for the motor pump unit 12. The buffer elements 110, 112, 114 and 116 held on the screw domes 94, 96 are clamped between the front section 14 and the rear section 16.

The motor pump unit 12 is, therefore, mounted on the rear section 16, which forms a support structure for the motor pump unit 12 in combination with the support bracket 88 and the supporting device 90, via the buffer elements 84, 86, 110, 112, 114 and 116. It is ensured as a result of the mounting of the motor pump unit 12 via the buffer elements 84, 86 and 110 to 116 that mechanical vibrations (body noise) cannot be transferred from the motor pump unit 12 to the rear section 16 via rigid, mechanical components. Since the motor pump unit 12 is arranged between the insulation mats 78 and 80, the transfer of air noise from the motor pump unit 12 to the front section 14 and to the rear section 16 is also made more difficult at least to a considerable extent.

The first insulation mat 78 has openings 118, 120 which have the pressure connection piece 52 and the suction connection piece 48, respectively, passing through them. The first insulation mat 78 therefore surrounds the pressure connection piece 52 and the suction connection piece 48. The two connection pieces 48 and 52 pass through the openings 18 and 20, respectively, of the front section 14, wherein they are decoupled mechanically from the front section 14 in that they are at a distance in relation to the edges of the openings 18 and 20. Mechanical vibrations of the motor pump unit 12 cannot, therefore, be transferred directly to the front section 14 via the suction connection piece 48 and the pressure connection piece 52. Also, air noise cannot, in practice, pass outwards through the openings 18 and 20 since the suction connection piece 48 and the pressure connection piece 52 are surrounded by the first insulation mat 78 in this area.

As already mentioned, the electric motor 38 is designed to be fan-less. The cooling of the electric motor 38 is not brought about by means of a stream of cooling air. For this reason, openings for cooling air can be dispensed with not only for the front section 14 but also for the rear section 16. The cooling of the electric motor 38 is brought about, on the contrary, by means of the liquid which is supplied to the pump via the suction connection piece 48. Before the liquid can pass from the suction connection piece 48 to the suction inlet 46, it is supplied to the cooling jacket 40 via an inlet line 122. The liquid is then guided around the electric motor 38 for the purpose of cooling it within the cooling jacket 40 and, subsequently, the liquid is conveyed to the suction inlet 46 via an outlet line 124. In combination with the outlet line 124, the inlet line 122 therefore forms a line assembly, via which liquid which is intended to be subjected to pressure by the pump 44 can be supplied first of all to the electric motor for the purpose of cooling it.

As already mentioned, ventilation openings for the front section 14 and the rear section 16 can be dispensed with since the cooling of the electric motor 38 is brought about by the liquid which is to be subjected to pressure by the pump 44. However, in order to ensure that exiting liquid cannot reach current-carrying parts of the electric motor in the case of any malfunctioning of the high-pressure cleaning device, the rear section 16 has first outflow openings 126 adjacent to the pump 44 in the area of the bottom wall 26 and second outflow openings 128 are arranged in the area of the rear wall 24 as well as of the two side walls 30 and 32 directly adjoining the bottom wall 26. The outflow openings 126 and 128 are arranged in side areas of beads integrally formed in the rear section 16 and have, in their entirety, an opening surface area of less than 3000 $mm^2$, in particular an opening surface area of at the most 1500 $mm^2$. In the case of any malfunctioning, liquid can flow out of the housing of the high-pressure cleaning device 10 via the outflow openings 126 and 128 before the liquid can come into contact with current-carrying parts. The outflow openings 126 and 128 are, in this respect, of such small dimensions that practically no cooling air can pass into the housing of the high-pressure cleaning device 10 but that the requirements to be placed on the high-pressure cleaning device 10 with respect to safety are fulfilled without any problem. The dimensioning of the entire opening surface area of the outflow openings 128 and 126 to at the most 3000 $mm^2$, in particular to less than 1500 $mm^2$, ensures that the high-pressure cleaning device 10 has a relatively low sound power level despite the reliable guarantee of all the technical requirements relating to safety. The sound power level of the high-pressure cleaning device 10 is less than 78 dB(A), measured in accordance with European standard EN 60704.

The invention claimed is:

1. High-pressure cleaning device, comprising:
- a motor pump unit, the motor pump unit comprising a liquid-cooled electric motor and a pump driven by the electric motor,
- a housing surrounding the motor pump unit,
- the pump having a suction inlet for a supply of liquid to be subjected to pressure and a pressure outlet for discharging the liquid subjected to pressure,
- wherein:
  - the liquid is suppliable to the electric motor for the purpose of cooling the electric motor and is subsequently subjected to pressure by the pump,
  - the electric motor is configured as a fan-less asynchronous motor,
  - the motor pump unit is held at one end on a support structure of the high-pressure cleaning device via at least one vibration-damping buffer element,
  - the motor pump unit is connected at the one end to a supporting device held on the support structure via the at least one vibration-damping buffer element,
  - the supporting device has a bridge section fixed in place on at least one of the pressure outlet and a pressure connection piece connected to the pressure outlet, and
  - the bridge section is fixed in place on the support structure with the at least one vibration-damping buffer element inserted in between the bridge section and the support structure.

2. High-pressure cleaning device as defined in claim 1, wherein the motor pump unit is surrounded by at least one sound absorbing element over at least part of an outer circumference.

3. High-pressure cleaning device as defined in claim 1, wherein:
- the housing has a front section and a rear section accommodating the motor pump unit between them,
- a sound absorbing element is arranged at least one of between the rear section and the motor pump unit and between the front section and the motor pump unit.

4. High-pressure cleaning device as defined in claim 1, further comprising at least one sound absorbing element configured as an insulating mat.

5. High-pressure cleaning device as defined in claim 1, wherein:
- at least one of a suction connection piece is connected to the suction inlet and a pressure connection piece is connected to the pressure outlet,
- the at least one of the suction connection piece and the pressure connection piece passes through an insulation mat.

6. High-pressure cleaning device as defined in claim 1, wherein:
- at least one of a suction connection piece is connected to the suction inlet and a pressure connection piece is connected to the pressure outlet,
- the at least one of the suction connection piece and the pressure connection piece passes through an opening in the housing, is decoupled mechanically from an edge of the opening and is surrounded at the opening by a sound absorbing element.

7. High-pressure cleaning device as defined in claim 1, wherein:
- the housing has outflow openings with an overall opening surface area not exceeding 3000 $mm^2$ at a sound power level of the high-pressure cleaning device of at the most 78 dB(A),
- the liquid can flow out of the housing via the outflow openings in case of any malfunctioning of the high-pressure cleaning device.

8. High-pressure cleaning device as defined in claim 7, wherein the overall opening surface area of the outflow openings is at the most 1500 $mm^2$.

9. High-pressure cleaning device as defined in claim 7, wherein the outflow openings are arranged in an area of the housing adjacent to the pump.

10. High-pressure cleaning device as defined in claim 7, wherein:
- the housing has a front section and a rear section accommodating the motor pump unit between them, and
- the outflow openings are arranged in the rear section next to the pump.

11. High-pressure cleaning device as defined in claim 1, wherein at least one outflow opening of the housing is covered by a sound absorbing element.

12. High-pressure cleaning device as defined in claim 1, wherein at least two further vibration-damping buffer elements are arranged at an outer circumference of the motor pump unit, said at least two further vibration-damping buffer elements accommodating the motor pump unit between them and being held on the support structure of the high-pressure cleaning device.

13. High-pressure cleaning device as defined in claim 12, wherein two of the at least two further vibration-damping buffer elements are located diametrically opposite one another.

14. High-pressure cleaning device as defined in claim 12, wherein:

the support structure comprises a rear section of the housing, a support bracket is securable to the rear section and engages around the motor pump unit, a first of the at least two further vibration-damping buffer elements is arranged between the rear section and the motor pump unit, and a second of the at least two further vibration-damping buffer elements is arranged between the support bracket and the motor pump unit.

15. High-pressure cleaning device as defined in claim 1, wherein:

the bridge section is further fixed in place on a suction connection piece connected to the suction inlet.

16. High-pressure cleaning device as defined in claim 1, wherein:

the motor pump unit has a switch device for switching the electric motor on and off, the switch device comprises an actuating element passing through an actuating opening of the housing, the actuating opening is defined by an edge of the actuating opening in the housing, said edge forming a labyrinth in combination with the actuating element.

17. High-pressure cleaning device as defined in claim 16, wherein the actuating element comprises an annular wall covering the actuating opening on at least one of an inner side and an outer side of the actuating opening.

18. High-pressure cleaning device as defined in claim 17, wherein the annular wall is surrounded by a circumferential collar, the edge of the actuating opening dipping into said collar.

19. High-pressure cleaning device as defined in claim 16, wherein the edge of the actuating opening is designed in a funnel shape.

20. High-pressure cleaning device as defined in claim 1, wherein, irrespective of an operating state of the high-pressure cleaning device, a rotational speed of the electric motor is less than 3600 revolutions per minute when configured as an asynchronous motor with a mains frequency of 60 Hz and less than 3000 revolutions per minute when configured as an asynchronous motor with a mains frequency of 50 Hz.

21. High-pressure cleaning device as defined in claim 1, wherein the electric motor is configured as a two-pole asynchronous motor.

22. High-pressure cleaning device as defined in claim 1, wherein electric power of the electric motor is at the most 3500 W.

23. High-pressure cleaning device as defined in claim 1, wherein a sound power level of the high-pressure cleaning device is at the most 78 dB(A).

* * * * *

UNITED STATES PATENT AND TRADEMARK OFFICE

CERTIFICATE OF CORRECTION

PATENT NO. : 8,727,748 B2
APPLICATION NO. : 13/103169
DATED : May 20, 2014
INVENTOR(S) : Walter Schiffhauer It is certified that error appears in the above-identified patent and that said Letters Patent is hereby corrected as shown below:

On the title page, item [75] Inventors should read: Walter Schiffhauer, Leutenbach (DE).

Signed and Sealed this
Ninth Day of September, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,727,748 B2
APPLICATION NO. : 13/103169
DATED : May 20, 2014
INVENTOR(S) : Groeger et al.

It is certified that error appears in the above-identified patent and that said Letters Patent is hereby corrected as shown below:

On the title page, item [75] second Inventor should read: Walter Schiffhauer, Leutenbach (DE).

This certificate supersedes the Certificate of Correction issued September 9, 2014.

Signed and Sealed this
Seventh Day of October, 2014

Michelle K. Lee

Michelle K. Lee
*Deputy Director of the United States Patent and Trademark Office*